Nov. 26, 1963  L. C. PACHNER  3,111,734
FISH STRINGER
Filed July 29, 1960

INVENTOR.
LEO C. PACHNER
BY
ATTORNEYS

United States Patent Office 3,111,734
Patented Nov. 26, 1963

3,111,734
FISH STRINGER
Leo C. Pachner, Momence, Ill., assignor to P & K Incorporated, Momence, Ill., a corporation of Illinois
Filed July 29, 1960, Ser. No. 46,160
1 Claim. (Cl. 24—161)

The present invention relates to fish stringers, and more particularly to a highly improved stringer and to a novel fish holder for use therein.

It is well known that most fish stringers have heretofore been made of metal and that, as a consequence, they have been subject to all of the disadvantages that arise when metal is used in or around water. The prior fish stringers have rested and deteriorated particularly quickly when they have been used in salt water, and their useful life has also been relatively short when they have been used in fresh water. They furthermore have had other disadvantages that have caused fishermen often to avoid their use. They have been relatively heavy and inconvenient to carry in a tackle box; their use often results in cut fingers; and they tend to make noise and to mar the finish when they are bumped against a boat. For these reasons and others, metal fish stringers have not been entirely satisfactory.

In order to avoid the use of metal in fish stringers, some efforts have heretofore been made to construct fish stringers of plastic material, and the fish stringer shown in U.S. Patent No. 2,801,038 is representative of those efforts. In each case of which I am aware, however, prior plastic fish stringers have required the use of a plurality of separate parts in order to obtain effective and safe latching of the fish holders in closed position, with the result that such fish stringers have been relatively expensive to manufacture and have not been easily and conveniently operated.

One of the objects of the present invention is to provide a highly improved fish stringer wherein each of the fish holders thereon is of inexpensive single-piece, plastic construction having an extremely simple and fool-proof latching means by which the holder may be securely and safely locked in closed position. Another object of the invention is to provide a fish holder of resiliently flexible material provided with a head having an apertured finger depending therefrom for cooperation with a bill formed on the free end of a fish receiving loop on the holder, the bill being adapted to be received by the aperture and to hook onto an edge thereof to latch the free end of the loop to the finger. Still another object is to provide a fish holder of the kind just stated wherein the axis of the aperture and the longitudinal axis of the free end of the fish receiving loop normally are disposed at an angle with respect to each other, and wherein the dimensions of the aperture and of the bill received thereby are such that the parts of the fish holder must be flexed to reduce the angle between the axes in order for the bill to pass through the aperture in a locking movement or in disengaging movement, thereby providing simple but positive latching of the free end of the fish receiving loop and providing latching means which cannot be inadvertently disengaged.

As will become apparent as the description proceeds, the stringer and fish holder of the present invention avoid all of the disadvantages referred to above with respect to metal stringers. The present stringer and fish holder are very inexpensive to manufacture, are safe and silent in operation, very light weight, and are devoid of any tendency to deteriorate in either fresh or salt water.

These and other objects and advantages of the present invention will be apparent from the following description, taken with the accompanying drawings wherein.

Figure 1:
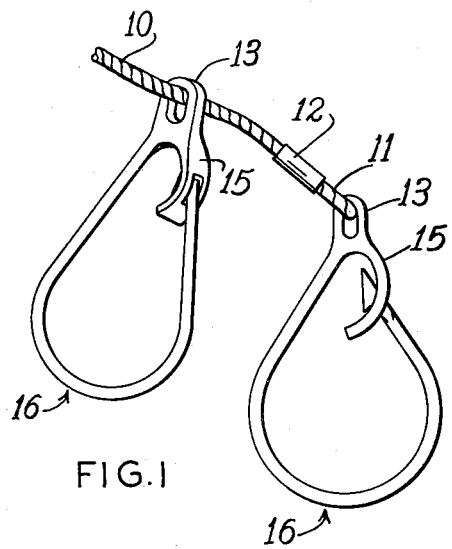
FIG. 1 is a fragmentary view showing one end of a fish stringer embodying the present invention with two fish holders being illustrated on the stringer, one of the fish holders being shown in perspective and the other fish holder being illustrated in elevation.

As illustrated in the drawing, a fish stringer constructed in accordance with the present invention may employ a cord 10 to which the several fish holders are suitably attached. This cord is preferably constructed of braided polyethylene or the like, but the cord may consist of a chain or a fiber cord of any suitable construction. In the present instance the polyethylene cord is provided with a loop 11 at one end, the free end of the loop being secured to the body of the cord 10 by a clamp 12.

As illustrated in FIG. 1, one fish holder is shown to be secured to the cord 10 at the loop 11 and another fish holder is shown to be slidably received upon the cord 10. It will of course be understood that the opposite end of the cord, not shown, may be provided, if desired, with a loop like the loop 11 for retaining a fish holder and that any desired number of fish holders may be slidably retained upon the cord intermediate its ends.

The several fish holders are preferably identical, and each is preferably of single piece construction molded from a suitable resiliently flexible, synthetic organic thermoplastic material. One such suitable material is polypropylene which is presently manufactured by the Hercules Powder Company and sold under the trademark "Pro-Fax." Polypropylene is a very light, durable, resilient, flexible and relatively inexpensive thermoplastic compound having low water absorption qualities, a specific gravity of less than 1.00 so that it tends to float, and it is ideally suited for the present purposes. Other suitable thermoplastic materials however are available for the formation of the present fish holder. For example, acetal resin manufactured by E. I. du Pont de Nemours & Company, Inc., under the trademark "Delrin" may be used to advantage inasmuch as it, like polypropylene, has relatively high strength, good stiffness qualities, excellent fatigue life and exceptional resilience and toughness. Nylon and other thermoplastic materials may also be employed.

Figure 2:
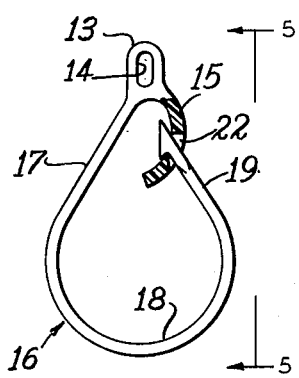
FIG. 2 is an elevational view of a fish holder of the present invention in its closed and latched condition, a portion thereof being illustrated in vertical cross-section to show the manner in which the bill on the free end of the fish receiving loop engages an aperture in a finger of the holder.
Figure 4:
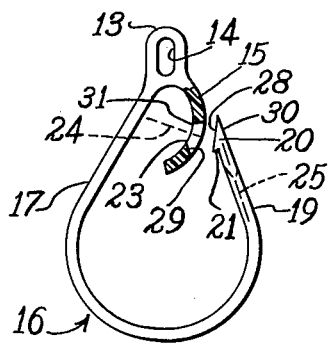
FIG. 4 is a similar elevational view of the fish holder in its open or disengaged condition.

Each of the fish holders is provided with a head 13 having an eye 14 formed therein for receiving the cord 10 of the stringer. A downwardly curved finger 15 is integrally formed on the lower side of the head 13 and depends therefrom in a graceful arc. Opposite the finger 15 on the lower side of the head 13 there is integrally formed a generally hook-shaped fish receiving loop 16. The shank portion 17 of this loop may be relatively straight adjacent the head 13 and it then curves in an arc, as at 18, so that the free end 19 of the loop in its normal or free position is disposed adjacent finger 15, as best seen in FIG. 4. The extremity of the free end of the loop 16 is provided with a pointed bill 20 having a barb 21 formed on one side thereof. This bill and the barb cooperate with an aperture 22 extending transversely through the finger 15, the construction being such that the bill may be passed through the aperture and the barb will thereupon become latched upon the lowermost edge 23 of the aperture to retain the fish holder in its closed position, as shown in FIG. 2 and as more fully explained below.

The present fish holder is molded of resilient, flexible material and the normal unflexed relative positions of the finger 15 and the free end 19 of the fish receiving loop are illustrated in FIG. 4. In these positions, it will be observed, the axis 24 of the aperture 22 and the longitudinal axis 25 of the free end portion 19 of the fish receiving loop 16 lie at an acute angle with respect to each other. The dimensions of the aperture 22 and that of the bill 20, on the other hand, are such that the bill 20 can be passed through the aperture 22 only when the finger 15 and the fish receiving loop 16, or both, are flexed to relative positions wherein the normal angle between the axes 24 and 25 is materially reduced, this being true because the vertical dimension of the aperture 22 at its inner mouth is only slightly greater than the maximum transverse dimension of the bill 20 at its barbed end.

In manipulating the fish holder from its open condition (FIG. 4) to its closed and latched condition (FIGS. 1 and 2), the free end 19 of the fish receiving loop 16 is first flexed to bring the tapered surface 28 of the bill 20 into contact with the downwardly sloping bottom interior surface 29 of the aperture 22, it being observed that the vertical dimension of the outer mouth of the aperture is substantially greater than the vertical dimension of the inner mouth of the opening. The free end portion 19 of the loop 16 is then moved upwardly slightly to bring the opposite surface 30 of the bill into contact with the upper edge 31 of the inner mouth of the aperture, whereupon further upward movement of the free end of the loop will cause the surface 28 of the bill to exert a camming action upon the surface 29, thereby causing simultaneous flexing of the lower part of the finger 15 to the left and a slight flexing of the free end 19 of the loop to produce automatic reduction of the angularity between the axes 24 and 25. Thus, as the bill 20 is pushed diagonally upwardly through the aperture 22, the angularity between the axes 24 and 25 is gradually reduced until the bill has passed completely through the aperture and the barb 21 has cleared the lower inner edge 23 of the aperture, whereupon the finger 15 and the free end portion 19 of the fish receiving loop will snap back toward their normal positions to cause the barb 21 to be positively hooked over the lower inner edge 23 of the aperture with the surface 30 on the opposite side of the bill pressed firmly against the upper inner edge 31 of the aperture 22, as seen in FIG. 2. A positive latching action thus results, with the bill 20 being securely and safely latched to the finger 15. In this condition the fish receiving loop 16 will hold the fish which may previously have been threaded onto the loop, for a downward pull on the loop, it will be observed, will merely tend to straighten out the curvature of the finger 15 and thus cause a tighter binding and latching relationship between the bill 20 and the edges of the aperture 22.

Figure 3:
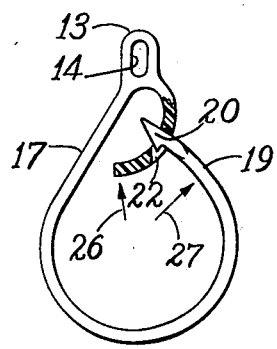
FIG. 3 is a similar view showing the finger and the free end portion of the fish receiving loop flexed from their normal positions to one permitting engagement or disengagement of the bill from the finger.
Figure 5:
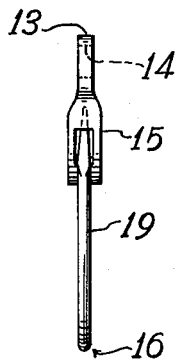
FIG. 5 is a side view of the fish holder taken substantially along the line 5—5 of FIG. 2.

In order to unlatch the bill 20 from the finger 15, a positive flexing of the finger 15 or the free end portion 19 of the loop 16, or both, must take place in order again to reduce the angularity between the axes 24 and 25 sufficiently to permit the barb 21 to be raised out of engagement with the inner lower edge 23 of the aperture and to permit the bill 20 to be retracted from the aperture. This unlatching movement or flexing of the parts is most easily brought about in the manner illustrated in FIG. 3. The lower end of the finger 15 is flexed to the left and upwardly by pressing thereon in the direction of the arrow 26 while, at the same time, the inside of the free end portion of the loop 16 is flexed outwardly by pressure applied thereto in the direction of the arrow 27. This flexing of the parts brings the axes 24 and 25 into substantial alignment, or at least reduces the angle therebetween, so that the barbed bill 20 may easily be withdrawn from the aperture 22. It will be appreciated, of course, that the flexing of the parts, as just described, may be utilized in either latching or unlatching the loop 16 with respect to the finger 15.

The simplicity of the present fish holders and stringer permits the same to be manufactured easily and inexpensively, thereby providing a stringer and fish holders therefor that have substantially all of the advantages of strength that previously were available in metal stringers, but with substantially none of the disadvantages thereof. The present fish holders, in fact, are less likely to become unlatched than prior metal holders, and they have no tendency to rust, rot, or corrode. Furthermore, they are safe and silent in operation and, despite their inexpensive one-piece construction, are far superior to prior plastic fish holders.

As indicated above, various resiliently flexible plastic materials may be employed in the manufacture of my fish holders and stringers, but I presently prefer to use polypropylene for the holders because it has the strength, toughness, durability and other qualities desired, plus a specific gravity of about 0.9. Thus, when a cord 10 of braided polyethylene is employed in conjunction with the polypropylene holders, the entire assembly will readily float if inadvertently dropped into the water.

Although one embodiment of the invention has been shown and described by way of illustration, it will be understood that the present stringer and fish holders may be constructed in various other forms without departing from the scope of the appended claim.

I claim:

A single-piece, synthetic organic plastic fish holder for a fish stringer, comprising a stringer engaging head, an inwardly curved resiliently flexible finger having one end joined to said head, said finger having a free end adapted for pressing thereon to flex the finger, a generally hook-shaped resiliently flexible fish receiving loop having one end integrally joined to said head and provided with a free end having a normal position adjacent said finger, said finger having an aperture extending transversely therethrough between said finger ends, the axis of said aperture being disposed at an angle with respect to the longitudinal axis of said free end of said fish receiving loop when said free end of said loop and said finger are in their respective unflexed positions, and a bill on said free end of said fish receiving loop having a transverse dimension only slightly less than the corresponding transverse dimension of said aperture so that said bill may be passed through said aperture only when the angle between said axes has been reduced by relative flexure between said finger and said fish receiving loop, said bill including a barb for hooking over an edge of said aperture when said bill has been passed through said aperture.

References Cited in the file of this patent

UNITED STATES PATENTS

| 548,694 | Breul | Oct. 29, 1895 |
| 876,402 | Schacht | Jan. 14, 1908 |
| 2,564,242 | Wendt | Aug. 14, 1951 |
| 2,604,243 | John | July 22, 1952 |
| 2,801,038 | Hamel | July 30, 1957 |
| 2,944,312 | Lacy | July 12, 1960 |

FOREIGN PATENTS

| 380,906 | France | Oct. 23, 1907 |
| 917,217 | Germany | Aug. 26, 1954 |
| 298,763 | Great Britain | Oct. 18, 1928 |

OTHER REFERENCES

I.B.M. Technical Disclosure Bulletin, volume 2, Number 1, June 1959.